(12) United States Patent
Yagi et al.

(10) Patent No.: US 6,268,884 B1
(45) Date of Patent: *Jul. 31, 2001

(54) IMAGE RECORDING APPARATUS AND METHOD AS WELL AS IMAGE REPRODUCING APPARATUS AND METHOD

(75) Inventors: Shigeru Yagi; Nobuyuki Torigoe, both of Minamiashigara (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,128

(22) Filed: Jul. 7, 1997

(30) Foreign Application Priority Data

Jul. 16, 1996 (JP) ................................................ 8-186303

(51) Int. Cl.[7] ..................................................... H04N 5/208
(52) U.S. Cl. ............................................. 348/252; 382/199
(58) Field of Search .............................. 348/26, 397.1, 348/252, 625; 382/199, 242, 294, 299; 386/52, 117, 4, 379–379.1

(56) References Cited

U.S. PATENT DOCUMENTS

| 4,011,568 | * | 3/1977 | Oughton et al. | 354/3 |
| 4,127,877 | * | 11/1978 | Morishita et al. | 358/213 |
| 4,823,190 | * | 4/1989 | Yamamoto | 358/166 |
| 4,884,224 | * | 11/1989 | Hirosawa | 364/550 |
| 5,029,004 | * | 7/1991 | Shibayama | 358/162 |
| 5,032,909 | * | 7/1991 | Sato et al. | 358/162 |
| 5,345,259 | * | 9/1994 | Shibazaki | 348/26 |
| 5,420,709 | * | 5/1995 | Kato et al. | 359/72 |
| 5,537,154 | * | 7/1996 | Ahn | 348/629 |
| 5,612,750 | * | 3/1997 | Yagi | 348/625 |
| 5,680,471 | * | 10/1997 | Kanebako et al. | 382/128 |

FOREIGN PATENT DOCUMENTS 7-56187 * 3/1995 (JP) .............................. G02F/1/135

* cited by examiner

*Primary Examiner*—Wendy R. Garber
*Assistant Examiner*—Aung S. Moe
(74) *Attorney, Agent, or Firm*—Oliff & Berridge, PLC

(57) ABSTRACT

Light from a subject is divided by an optical system, one of which is focused on a receiving surface of a first image sensing device. The first image sensing device generates pixel information having low pixel density and multi-value for the image of the subject. The other light is transmitted to outline extracting means to generate an outline image. The outline image is picked up by a second image sensing device to generate binary pixel information having high pixel density for the outline image. The pixel information of the image and the pixel information of the outline are transmitted to an image reproduction processor via a data processor compose an image of high pixel density.

26 Claims, 7 Drawing Sheets

OUTLINE

TWO-DIMENSIONAL INFORMATION

OUTLINE INFORMATION

IMAGE RECORDING APPARATUS AND METHOD AS WELL AS IMAGE REPRODUCING APPARATUS AND METHOD

BACKGROUND OF THE INVENTION

1. Field of the Invention

The present invention relates to an electronic image recording or reproducing apparatus or a method thereof, and more particularly to an electronic image recording and reproducing apparatus or a method thereof capable of recording and reproducing with a high speed an image having a high pixel density without deteriorating image quality.

2. Description of Related Art

A recent development of digital technique has brought a use of an electronic still camera instead of a photograph using silver salt. The electronic still camera does not necessitate a wet developing processing and processing in a darkroom, which is different from a silver salt photograph. The electronic still camera has various characteristics such as simple image processing or simple data transfer, whereby it has been rapidly popularized to be used for a communication to a remote place, inputting an image to a computer, inputting to a television for domestic use or the like. The electronic still camera is provided, as an image sensing apparatus, with an optical system having a lens and an image sensing device which is used instead of a film. A CCD (charge coupling device) solid image sensing device is used as the image sensing device to store the output in a memory or to data-transfer the output to a computer to perform image processing, to thereby be displayed on a CRT (cathode ray tube) or to output the image as a hard copy.

However, in order to obtain an image quality the same as that of a conventional silver salt photograph by using a two-dimensional CCD solid an image sensing device, necessary pixel number is ten million to forty million, which is one hundred to several hundred times as many as image pixels of a conventional digital still camera. Therefore, such a camera becomes expensive and is used for only a particular purpose. In the case of using the two-dimensional CCD solid image sensing device of high pixel as described above, it is possible to perform the picking up of an image with one shot same as the case of the silver salt photograph. However, the amount of data is huge, so that it takes several to ten minutes to read data. Accordingly, continuous image sensing of a subject cannot be performed. Moreover, a memory of large capacity such as a hard disc for storing data can memorize only one image, thereby entailing a problem of requiring a large-scale apparatus in the case of picking up several images as well as a problem of taking a long period for a transfer to a remote place.

On the other hand, there is a method to read an image with a scanning operation by using one-dimensional CCD solid image sensing device in order to solve the problem of high cost. In this case, several thousand pixels of the CCD are enough, to thereby be capable of rendering the apparatus low-cost. However, it is impossible to pick an image up in one shot like the silver salt photograph or two-dimensional CCD, and further, there is a problem that a continuous image picking up cannot be performed. Moreover, the amount of data to be processed is huge, thereby the problem remains the same as that in the case of the two-dimensional CCD with reference to a memory or transferring period.

It has been known that a spatial light modulating element is used for the image picking up of a subject in order to reduce a data transferring amount. The spatial light modulating element is mainly used as an optical element for executing an optical calculation such as an extraction of an outline and may be used for a stationary picture and motion picture.

In the case of converting a natural image to a characteristic image of a natural picture in the stationary picture, there may be the case where a logical operation such as a logical sum or logical product is optically performed.

With respect to the motion picture, it is considered to compress the motion picture information by using the spatial light modulating element for transferring the motion picture information of a predetermined frame in a predetermined period, which aims to express, as for the subjective image moving in a high speed, the image data at a predetermined time by a difference of data with respect to data having an equal predetermined resolution all over the pixels at a basic time. The data amount to be transferred can be proposed since image information is compressed by the difference of data. The outline formed by the spatial light modulating element is used for determining the area of the difference of data. The resolution of the difference of data is areally constant, i.e., constant with respect to area, and is the same as the resolution of data at the basic time.

Accordingly, a still camera using a two-dimensional CCD with approximately one million pixels is considered to be of a large pixel number type among electronic still cameras to generally be used. However, in the two-dimensional CCD with the pixels as described above, the outputted image is rough and image quality is degraded, with the result that use thereof is limited to an image output of a small size or to a display apparatus with less pixel. When the two-dimensional CCD with the pixels as described above is used for an output of a large size, the image quality is unfavorable compared to the output of a small size, with the result that it can only be used for a special purpose such as for utilizing real-time operation or image processing.

SUMMARY OF THE INVENTION

The present invention is accomplished in order to solve the aforesaid problems, and aims to provide a low-cost and high-quality electronic image recording and reproducing technique wherein an image whose pixel number is equivalent to the image quality of a silver salt photograph can continuously be picked up with a high speed, a solid state image sensing apparatus with reduced pixel number is used and memory amount is greatly decreased.

Another object is to provide an electronic image recording and reproducing technique wherein a transfer of image data can be performed in a short period to make it possible to perform on-line image processing by a computer or a transfer by communicating means.

Another object is to provide an electronic image recording and reproducing technique capable of easily outputting a high-quality image of a large size, the image being the same as that by a silver salt photograph.

In the present invention, in order to achieve the aforesaid objects, information required for obtaining high image quality can be inputted as necessary, whereby an image input element having pixels less than those of a last outputted image is utilized for providing a low-cost apparatus which is capable of performing recording or reproducing operation with a high speed and which has a memory of reduced capacity. In other words, color information or tone information has a rate of spatial change or spatial frequency smaller than that of an outline information with respect to a normal image. Therefore, multi-dimensional information is, although having a low pixel density, firstly inputted with reference to the color information or tone information, while low tone information of a single color is, although having a high pixel density, individually inputted with reference to the outline information. By this, the entire data amount is reduced to achieve both of a high speed operation and high image quality.

From the viewpoint of the first aspect of the present invention, in order to achieve the aforesaid objects, the image recording apparatus is provided with means for generating pixel information of an image by reading the image and means for generating pixel information of an outline of the image by reading the outline of the image.

By this construction, the pixel information of the image and the pixel information of the outline are individually generated, to thereby be capable of adopting the pixel density and dimensional data, both of which are suitable for these pixel information. As a result, the data amount generated upon image recording (sensing) can be reduced, whereby the image recording period can be made short as well as the transfer of the generated data can be performed in a short period.

Further in the above-mentioned construction, the pixel information of the outline can be made finer compared to the pixel information of the image. The means for generating the pixel information of the outline is able to possess means for optically extracting a two-dimensional outline image from the image and image sensing means for generating the pixel information of the outline by reading out the extracted two-dimensional outline image. Further, the image sensing means is able to serve as one-dimensional image sensing means for reading out the outline image by scanning the same. This one-dimensional image sensing means is able to serve as one-dimensional solid state image sensing device. Moreover, the image sensing means can be used as two-dimensional solid image sensing means for reading out the outline image, and the two-dimensional image sensing means can serve as a two-dimensional solid image sensing device. Further, the means for optically extracting the outline image can utilize a spatial light modulating element. Moreover, the pixel information of the outline can be generated based upon the outline of a predetermined single color image color-selected from the image. Further, the predetermined single color can be achromatic. Moreover, the pixel information of the outline may generate every color of the pixel information of the image.

From the viewpoint of the second aspect of the present invention, in order to achieve the aforesaid objects, the image reproducing apparatus which reproduces from the pixel information of the image and the pixel information of the outline pixel information having a pixel density higher than that of the aforesaid pixel information is provided with means for receiving the pixel information of the image, means for receiving the pixel information of the outline and means for converting the pixel information of the image into the pixel information having the pixel density higher than that of the image information by using the pixel information of the outline.

By this construction, an image of a high pixel density can be reproduced from less amount of data of the pixel information of the image and the pixel information of the outline. The reproduced image consists of pixel information capable of being outputted in a large size by, for example, an electrophotographic printer with low cost.

In this construction, the image reproducing apparatus may be provided with image output means for outputting a reproducing image by receiving the pixel information of the high pixel density. Further, the aforesaid image output means can output an image by an electrophotograhic manner.

From the viewpoint of the third aspect of the present invention, in order to achieve the above-mentioned objects, the image recording and reproducing apparatus is provided with means for generating pixel information of an image by reading said image, means for generating pixel information of an outline by reading the outline of the image, means for storing the pixel information of the image and the pixel information of the outline and means for converting the stored pixel information of the image into a pixel information having a pixel density higher than that of the image information by using the stored pixel information of the outline.

By this construction, the pixel information of the image and the pixel information of the outline are individually generated, to thereby be capable of adopting the pixel density and dimensional data, both of which are suitable for these pixel information. As a result, the data amount generated upon image recording (sensing) can be reduced, whereby the image recording period can be made short as well as the transfer of the generated data can be performed in a short period. Further, an image of a high pixel density can be reproduced from less amount of data of the pixel information of the image and the pixel information of the outline.

In this construction, the image recording or reproducing apparatus may also be provided with image output means for outputting a reproducing image by receiving the pixel information of the high pixel density.

Further, the present invention can be realized in a category of a method. Moreover, at least a part of the invention can be realized by a computer program.

DETAILED DESCRIPTION OF THE INVENTION

The present invention will be explained hereinbelow.

Figure 1:
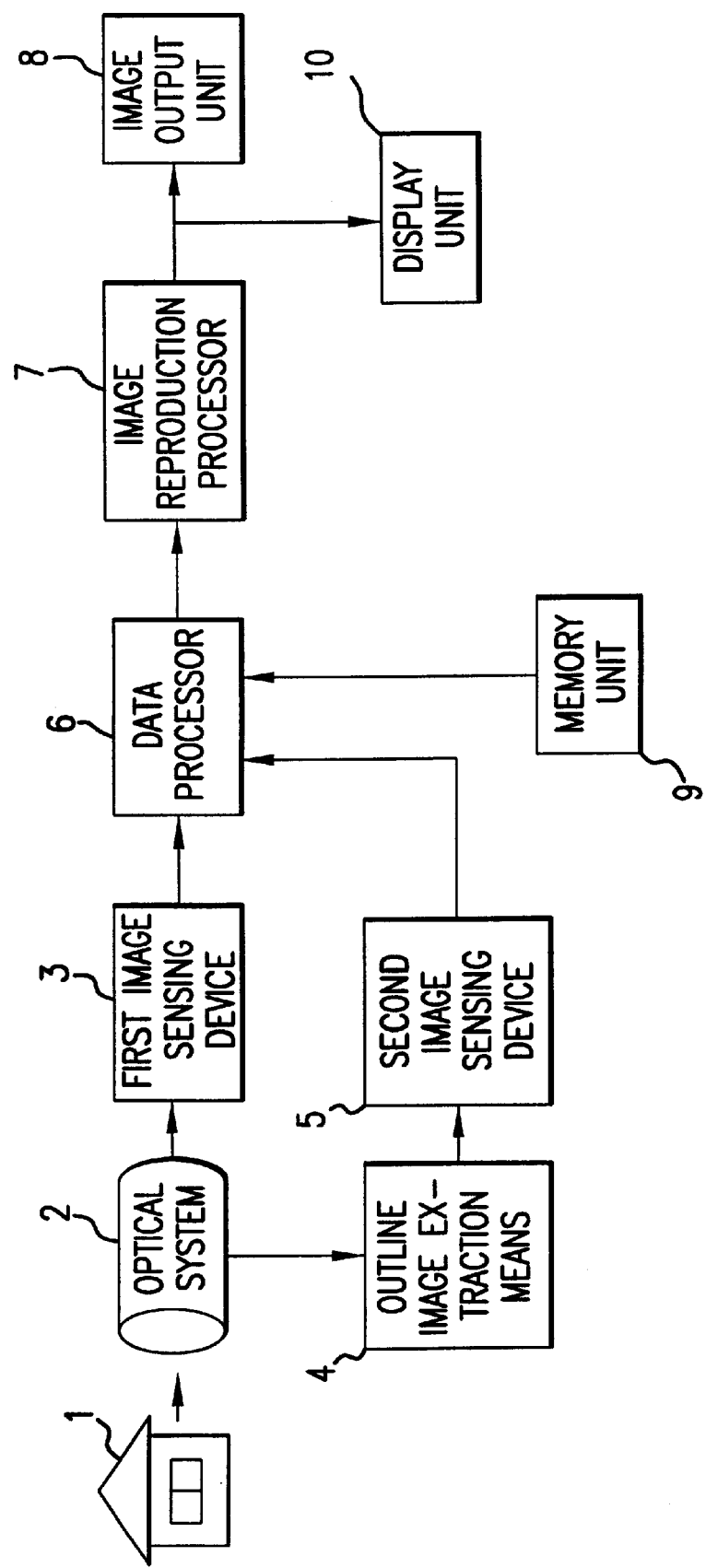
FIG. 1 is a view showing an example wherein the present invention is adapted to an electronic still camera.

FIG. 1 shows an electronic still camera to which the present invention is adapted, wherein a numeral 1 designates a subject, numeral 2 an optical system, numeral 3 a first image sensing device, numeral 4 outline image extracting means, numeral 5 a second image sensing device, numeral 6 a data processor, numeral 7 an image reproduction processing unit and numeral 8 an image output unit. The optical system 2 is provided with a lens and a half mirror or a prism for dividing light. One of the divided light is focused on the first image sensing device 3. The first image sensing device 3 is preferably a two-dimensional CCD which can two-dimensionally sense images. Although usable pixel number is one hundred thousand to six million, this number can suitably be selected in view of a desired last image quality, processing time, cost and so on.

An optical image of the subject 1 is focused on a receiving surface of the first image sensing device 3 which outputs color information and tone of three colors of the subject 1 as digital information.

In the electronic still camera according to the present invention, the image of the subject 1 to be picked up is inputted to the first image sensing device 3 (for example, two-dimensional CCD) for reading color of the image and/or tone data and to the outline image extracting means 4 for extracting the outline image with higher pixel while parallelly and accurately keeping a spatial positional relationship The outline image extracting means 4 is a spatial light modulating element consisted of a photoconductive member and a light modulating element. The extraction of the outline of image by using the spatial light modulating element can be achieved by a method using a light intensity dependency of a polarizing angle proposed, for example, in Japanese Published Unexamined Patent Application No. HEI 7-56187 or can be achieved by a method utilizing a difference of a motion degree of an electron and hole (The 38th Applied Physics Lecture P843 (1991)) or the like. The extraction of the outline of image is not only performed by dividing colors into three, but also by monotone information according to brightness in order to simplify the apparatus. In summary, a boundary between a bright portion and a dark portion of the image captured with high resolution can be displayed.

Figure 4:
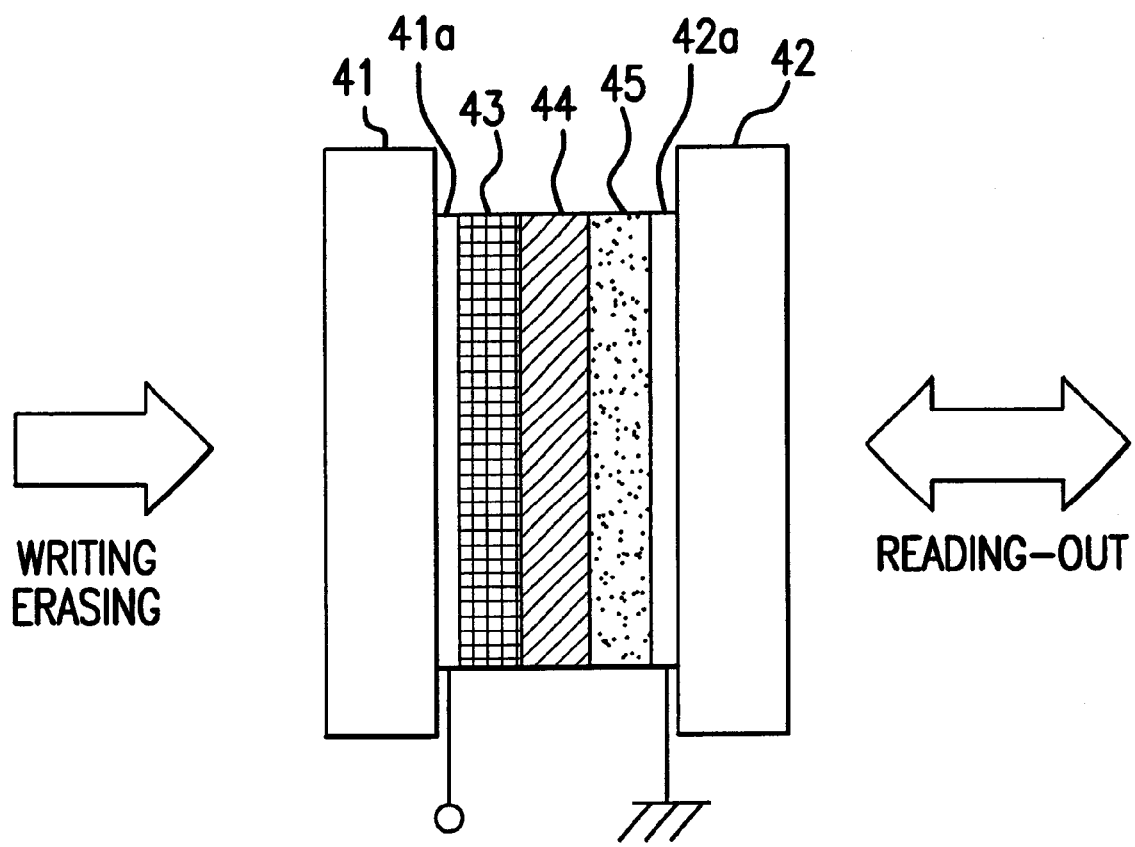
FIG. 4 is a view showing an example of a spatial light modulating element constructing outline information extracting means 4 in FIG. 1.

FIG. 4 shows the spatial light modulating element proposed in Japanese Published Unexamined Patent Application No. HEI 7-56187. In FIG. 4, the spatial light modulating element is comprised of a pair of glass plates 41, 42 to which transparent electrodes 41a, 42a are attached, a photoconductive film 43, a dielectric mirror 44 and a ferroelectric liquid crystal 45, wherein a driving voltage of bipolar is applied between the transparent electrodes 41a, 42a to write an outline image which is read out by reading-out light.

The outline image extracted by the outline image extracting means 4 is outputted as digitalized (binalized) by using the second image sensing device 5. A one-dimensional image sensing device is preferably utilized as this image sensing device from the viewpoint of outputting time and cost, since this image sensing device outputs outline information with high resolution. In this case, the image from the outline image extracting means 4 may be linearly imaged in a sequential manner on a fixed one-dimensional image sensing device by using the optical system or may be scanned by the image sensing device. The extraction of the outline image is performed to compensate for roughness of the resolution of the two-dimensional image sensing device. The original resolution is therefore enough for an unclear boundary of an image or for a portion in which a change in color or tone is gentle, so that the extraction of the outline image is unnecessary. The extraction of the outline of image may be executed only with reference to a clear boundary portion or a high resolution portion such as a hair or the like.

It is to be noted that a two-dimensional image sensing device such as a two-dimensional CCD may be used as the second image sensing device 5. In this case, the output is binary, so that the reading-out time is short enough.

The image information digitalized by the first image sensing device 3 and the second image sensing device 5 can be signalized for a reproducing processing by the data processor (computer) 6 as it is. After being subject to the image reproducing processing at the image reproducing processing device 7, a compressed image data for reproducing is printed as a high quality image at the image output unit 8. Usable kinds of the image output unit 8 are an ink jet printer, sublimate thermal printer, electrophotographic printer, and the like. Most preferable one is an electrophotographic printer with respect to speed and image quality.

It is to be noted that the image information may be recorded to a memory unit 9 from the first image sensing device 3 and the second image sensing device 5 to separately perform the reproduction processing. Further, these image information may be stored into the memory unit 9 as the compressed image data. Although the storing amount becomes large, the reproducing image data may be stored. Moreover, these image information may be displayed on an image display device The image picked up by this still camera has the data amount which is reduced to a tenth of or less than the original data amount, and thereby the image can instantly be processed as explained in FIG. 1, or may be outputted in a remote place by performing data transfer or transfer of a storing medium as explained with reference to FIGS. 2 and 3 hereinbelow.

Figure 2:
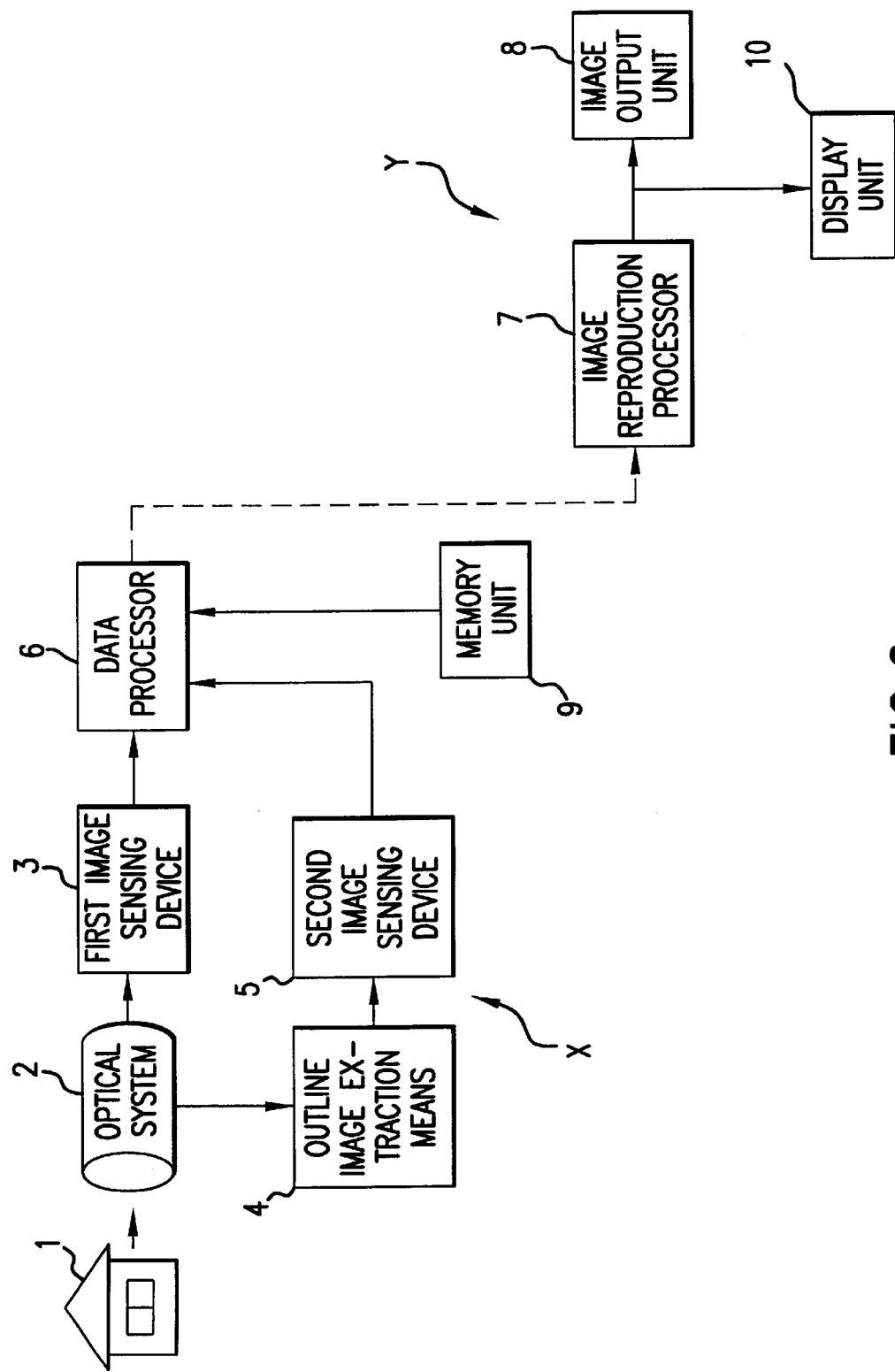
FIG. 2 is a view showing a modified example of FIG. 1.

FIG. 2 shows an example wherein a main body X of the electronic still camera and an image output section Y are separately provided for transferring data obtained by image picking up with the main body X of the electronic still camera to the image output section Y in a remote place to be ouputted. In FIG. 2, same numerals designate like or corresponding parts in FIG. 1 to omit the detailed explanation. In FIG. 2, the compressed image signal output from the data processor 6 is transferred to the image output section Y. The image output section Y is provided with the image reproducing processing device 7 for making it possible to transfer the image information which has pre-reproducing little data amount to the image output section Y from the first image sensing device 3 and the second image sensing device 5.

Figure 3:
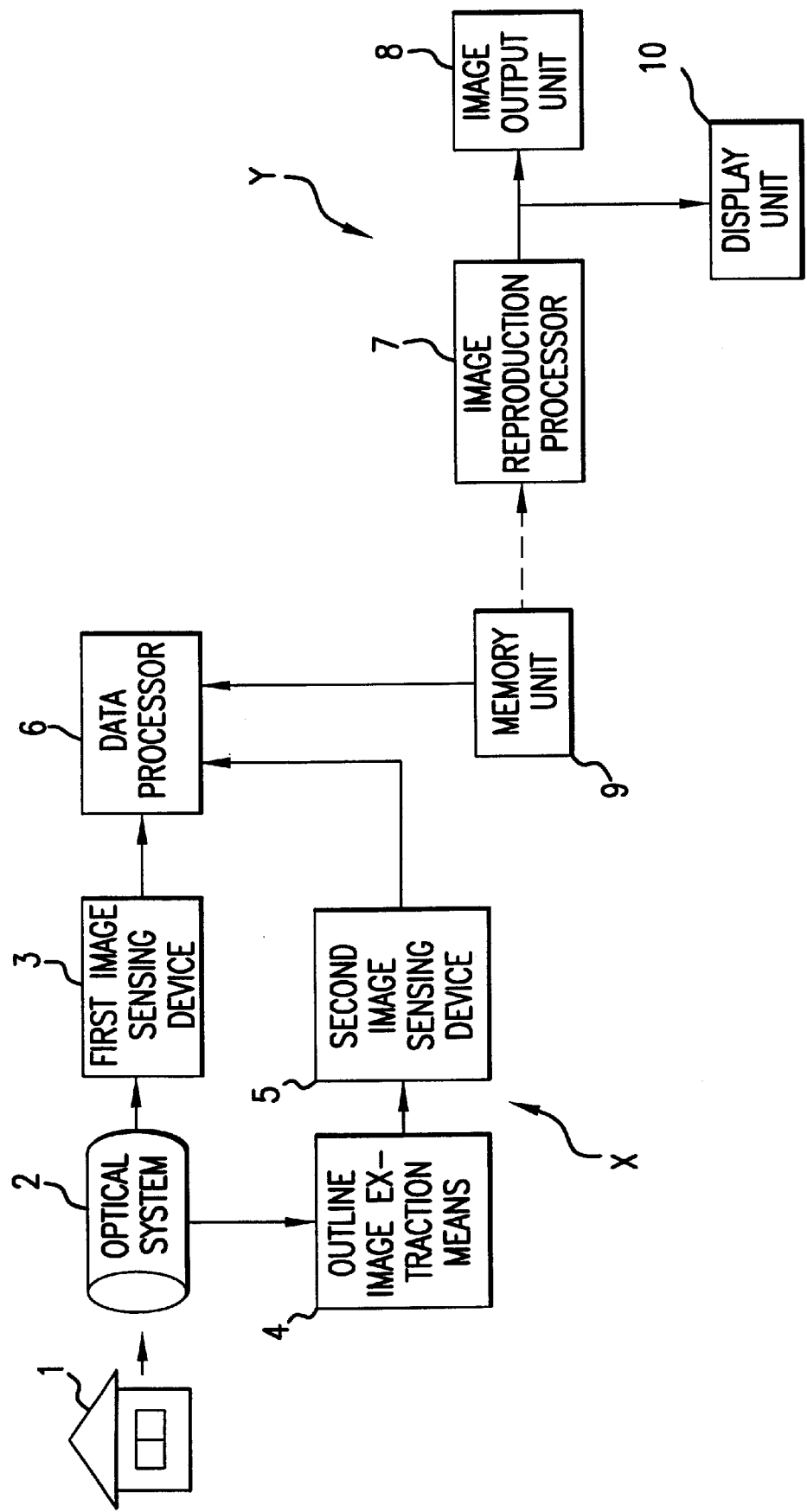
FIG. 3 is a view showing a further modified example of FIG. 1.

FIG. 3 shows an example using a carriable medium. In this figure, the memory unit 9 is a carriable storing medium. This memory device 9 is transported to the image output section Y in a remote place to read data of the memory unit 9 for performing the image output. It is to be noted that like parts in FIG. 3 are designated by like numerals in FIG. 1 to omit the detailed explanation.

In the above-mentioned example, the subject may generally be a moving one, or may be stationary such as a photograph, document or the like. According to the still camera of the present invention, the data amount to be read is small to thereby pick an image up with a high speed, resulting in that the next shot can immediately be executed. The moving subject can be picked up with a high speed, arising no problem. The present invention can be adapted to a video camera if the continuous image picking up is executed.

The present invention will be explained in detail hereinafter with reference to the following embodiment:

A system was used which was provided with a two-dimensional CCD camera with one million and fifty thousand pixels of 1500×1000 and is capable of digitally inputting three color information and 12-bit tone information. Further, a system was used wherein the extraction of the outline of image was optically performed by utilizing a spatial light modulating element consisting of a ferroelectric liquid crystal cell (2 microns) and an amorphous silicon photoconductive layer (5 microns), the obtained image being read by one-dimensional CCD sensor with 5000 pixels by 3000 steps. At this time, the size of the spatial light modulating element was 50×30 mm, and the resolution ability was 100 lines/mm. The extraction of the outline of image was executed by operating a bipolar pulse driving simultaneous with the optical writing after applying the initialized pulse. The outline of 10 microns or less can be extracted, which corresponds to approximately one pixel of the one-dimensional CCD sensor. The outline information comes to correspond to fifteen million pixels, and one color or tone pixel corresponds to approximately 10 outline pixels. The reading-out of the data is completed with the pixel one-fiftieth or less than that of using a CCD of perfect pixel, thereby being capable of being transferred to the computer. A new digital photograph can be inputted every several seconds to be capable of performing continuous image picking up on a practical use. Two kinds of digital data inputted as described above are reproduced as follows.

Figure 5:
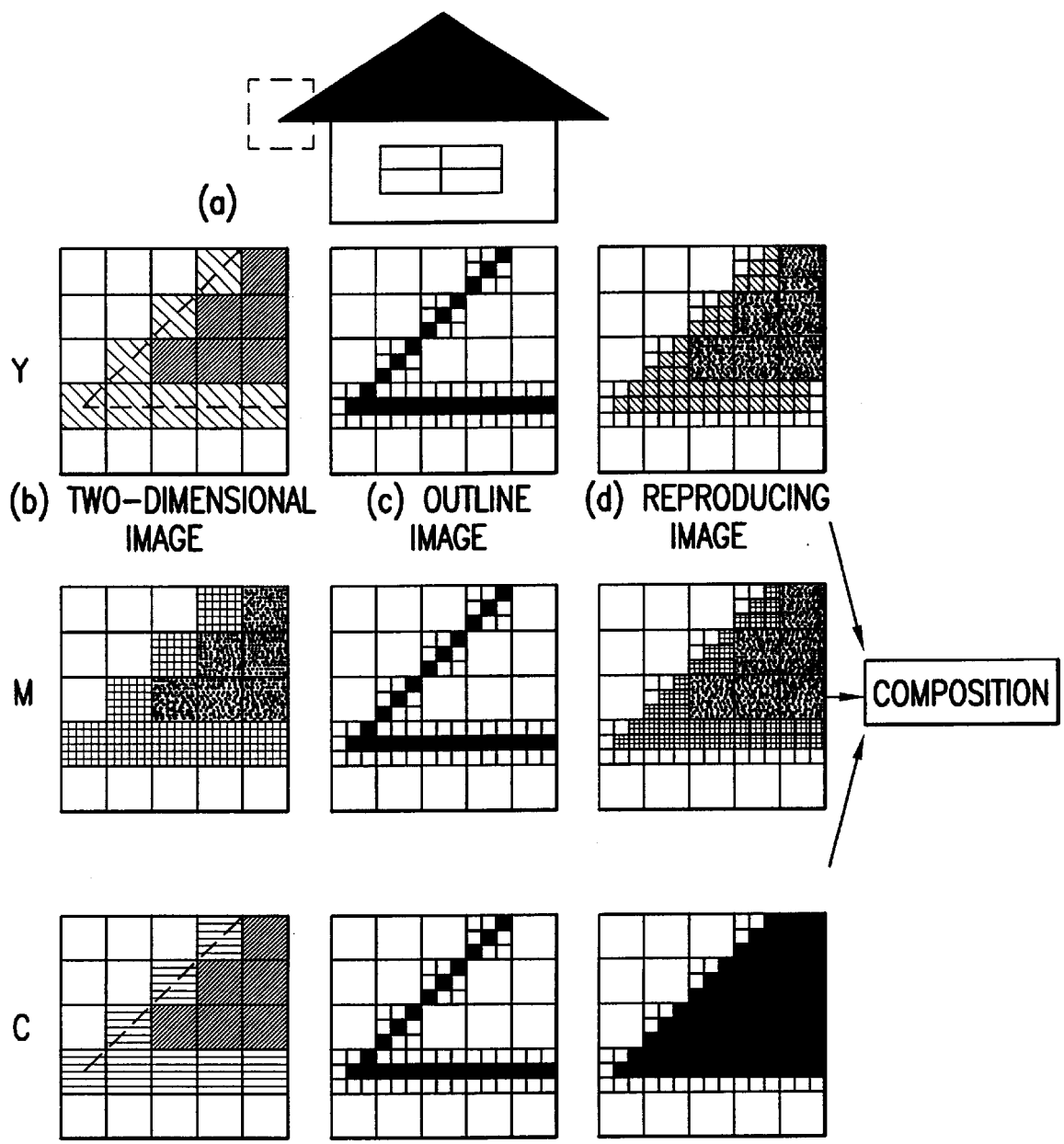
FIG. 5 is a view for explaining an image reproducing operation according to the present invention.

FIG. 5 shows an example for explaining. Although an yellow image is mainly explained hereinbelow, cyan and magenta images are processed in the same manner. The same outline image was used with respect to the respective color in this example.

In FIG. 5, a mark (a) designates a real image to be sensed. A mark (b) shows the yellow image from the two-dimensional CCD which is separated by a color filter and enlarged to a pixel level. A mark (c) illustrates a portion of a high resolution image of the extraction of the outline image. A mark (d) shows an image reproduced from the two-dimensional image (b) and the outline image (c). The outline image (c) is an outline of an image of a predetermined single color, for example, an achromatic image by the selection of the reading-out light or the like. This single kind of outline image is used not only for the yellow image but also for magenta and cyan images. It should be understood that the outline of the respective image corresponding to respective colors of yellow, magenta and cyan may be reproduced to be used.

Figure 6:
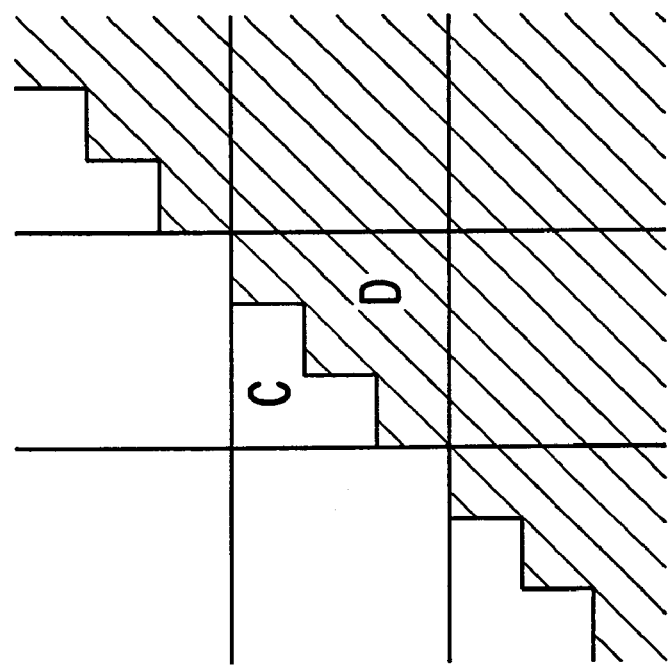
FIG. 6 is a view for explaining an image reproducing operation according to the present invention.
Figure 6:
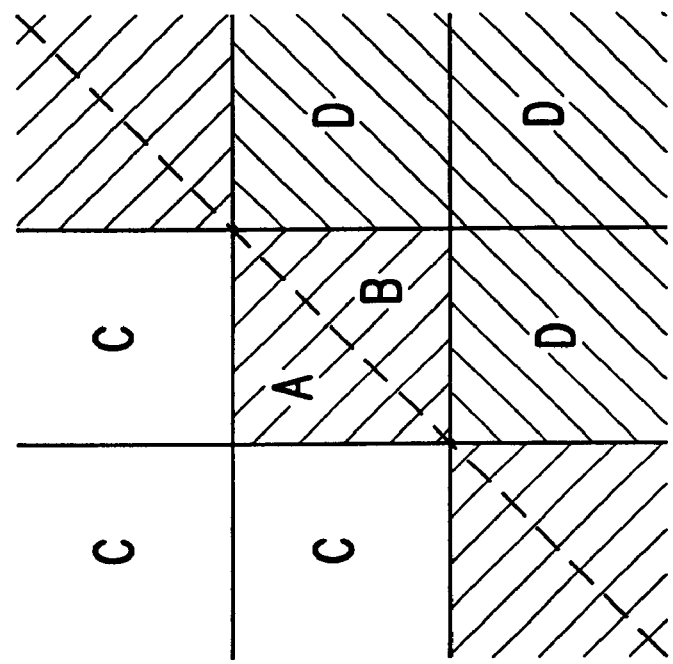
Figure 7:
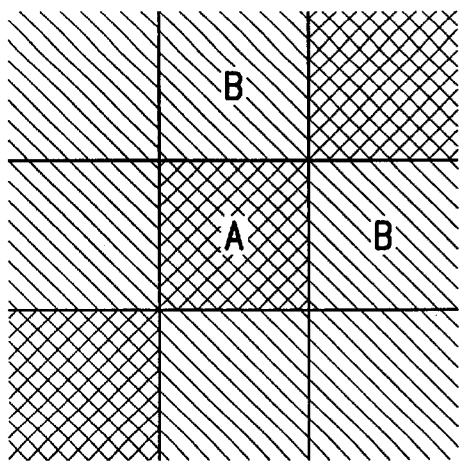
FIG. 7 is a view for explaining an image reproducing operation according to the present invention.
Figure 7:
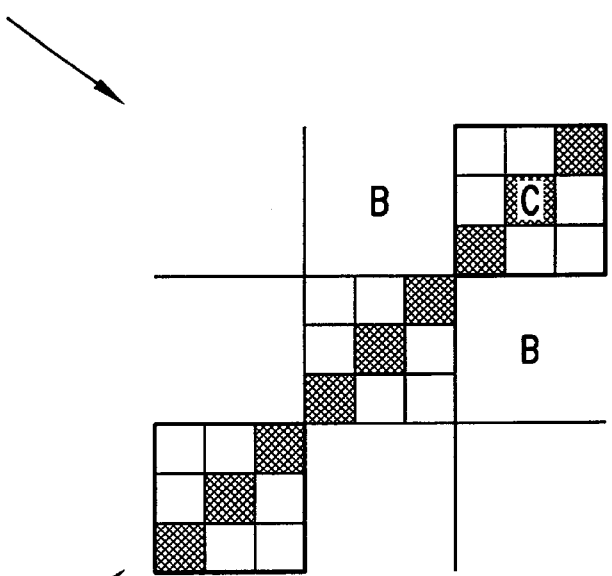
Figure 7:
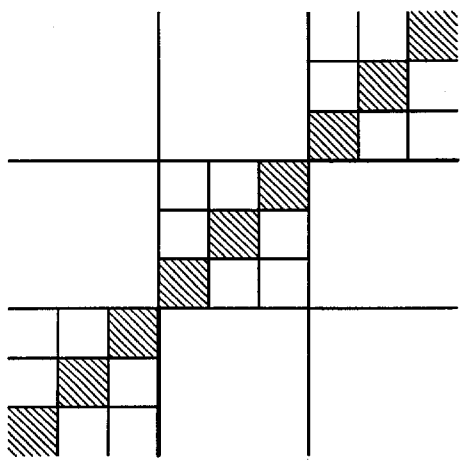

The reproducing processing is performed as follows. Firstly, the pixel portions of no outline among the data (b) are left as it is. The pixel portions having the outline shown in (c) among the data (b) are subject to the calculation as described below. As shown in FIG. 6, an average value of the data of the pixels adjacent to each other across the outline is used for the pixel having the outline among the pixels of (b). The average value of C is used for the portion A and the average value D is used for the portion B. Moreover, when there is no difference between the data (B) of the pixels adjacent to each other across the outline (in the case of hair or the like) as shown in FIG. 7, the outline is used as it is, and the value obtained by subtracting B from the pixel information A including the outline is used for the color or tone information C of the outline (e.g., hair). The fine yellow image corresponding to fifteen million pixels is reproduced as described above, whereby a color image can be reproduced combining with the cyan and magenta images reproduced in the same manner as the yellow image.

The digital data of the image reproduced in this way is subject to the image processing on a CRT screen, to be capable of being outputted by a digital electrophotographic printer as a color print of A4 size having a high image quality corresponding to 400 dpi as a hard print.

As explained above, the electronic image recording or reproducing system according to the present invention utilizes the image information and the outline information to compose the fine image, to thereby make the data amount small upon the picking up of image and achieve a reduction in image picking up time, control of the data storing amount and a reduction in data transferring time. On the other hand, the image having a resolution substantially equivalent to that of a photograph taken by using silver salt can electronically be recorded and reproduced.

What is claimed is:

1. An image recording apparatus comprising:
   an optical system that generates an image of an object;
   means for generating pixel information of said image; and
   means for generating pixel information of an outline of said image by optically extracting said outline image from said image, wherein said pixel information of the image and said pixel information of the outline are individually generated, and the pixel information of said outline has a higher pixel density than the pixel density of the pixel information of said image.

2. The image recording apparatus as defined in claim 1, wherein said means for optically extracting said outline image from said image comprises optically extracting a two-dimensional outline image from said image; and
   image sensing means for generating the pixel information of said extracted two-dimensional outline by reading said outline image.

3. The image recording apparatus as defined in claim 2, wherein said image sensing means is one-dimensional image sensing means for reading said outline image by scanning the same.

4. The image recording apparatus as defined in claim 3, wherein said one-dimensional image sensing means is one-dimensional solid image sensing device.

5. The image recording apparatus as defined in claim 2, wherein said image sensing means is a two-dimensional image sensing means for reading said outline image.

6. The image recording apparatus as defined in claim 5, wherein said two-dimensional image sensing means is a two-dimensional solid image sensing device.

7. The image recording apparatus as defined in claim 2, wherein said means for optically extracting said outline image utilizes a spatial light modulating element.

8. The image recording apparatus as defined in claim 1, wherein said pixel information of said outline is generated based upon an outline of an image of a predetermined single color which is color-selected from said image.

9. The image recording apparatus as defined in claim 8, wherein said predetermined single color is achromatic.

10. The image recording apparatus as defined in claim 1, wherein said pixel information of said outline is generated every color of the pixel information of said image.

11. An image reproducing apparatus for reproducing pixel information having a pixel density higher than that of said pixel information from said pixel information of said image and said pixel information of said outline generated by the image recording apparatus as defined in claim 1 comprising:
   means for receiving said pixel information of the image;
   means for receiving said pixel information of the outline; and
   means for converting said pixel information of the image into pixel information having a pixel density higher than that of said image information by using said pixel information of the outline.

12. The image reproducing apparatus as defined in claim 11, wherein said apparatus further comprises an image output means for outputting a reproducing image by receiving said pixel information of high pixel density.

13. The image reproducing apparatus as defined in claim 12, wherein said image output means outputs an image by an electrophotographic manner.

14. The image recording apparatus of claim 1, further comprising:
an image reproducing means that generates image data, wherein said image data has a higher pixel density than the pixel information of the image.

15. The image recording apparatus of claim 14, wherein said image reproducing means generates image data by comparing the pixel information of the image that is adjacent to the pixel information of the outline to the pixel information of the outline.

16. The image recording apparatus of claim 1, wherein the pixel information of the image is color information.

17. The image recording apparatus of claim 1, wherein the pixel information of the image is tone information.

18. An image recording and reproducing apparatus comprising:
an optical system that generates an image of an object;
means for generating pixel information of said image;
means for generating pixel information of an outline of said image by optically extracting said outline image from said image and reading said outline, wherein said pixel information of the image and said pixel information of the outline are individually generated, and the pixel information of said outline has a higher pixel density than the pixel density of the pixel information of said image;
means for storing said pixel information of said image and said pixel information of said outline; and
means for converting the stored pixel information of said image into pixel information having a pixel density higher than that of said image information by using said stored pixel information of said outline.

19. The image recording and reproducing apparatus as defined in claim 18, wherein said apparatus further comprises image output means for outputting a reproducing image by receiving said pixel information of high pixel density.

20. The image recording and reproducing apparatus of claim 18, wherein said means for converting said stored pixel information compares the pixel information of the image that is adjacent to the pixel information of the outline to the pixel information of the outline.

21. The image recording and reproducing apparatus of claim 18, wherein the pixel information of the image is color information.

22. The image recording and reproducing apparatus of claim 18, wherein the pixel information of the image is tone information.

23. An image recording method comprising:
generating an image of an object using an optical system;
generating pixel information of the image;
optically extracting said outline image from said image;
generating pixel information of an outline of said image by reading said outline, wherein said step for generating pixel information of the image and said step for generating pixel information of the outline are individual steps, and the pixel information of said outline has a higher pixel density than the pixel density of the pixel information of said image; and
storing said pixel information of said image and said pixel information of said outline.

24. An image reproducing method for reproducing pixel information having a pixel density higher than that of said pixel information from said pixel information of said image and said pixel information of said outline generated by the image recording method as defined in claim 23 comprising:
a step for receiving the pixel information of said image;
a step for receiving the pixel information of said outline; and
a step for converting the pixel information of said image into pixel information having a pixel density higher than that of said image information by using said pixel information of said outline.

25. The image recording method of claim 23, further comprising outputting image data that has a higher pixel density than the pixel information of the image.

26. The image recording method of claim 23, wherein outputting image data comprises comparing the pixel information of the image that is adjacent to the pixel information of the outline to the pixel information of the outline.

* * * * *